Jan. 10, 1961　　　H. D. BERQUIST　　　2,967,681
CONTROL STICK LOCK
Filed Oct. 9, 1957
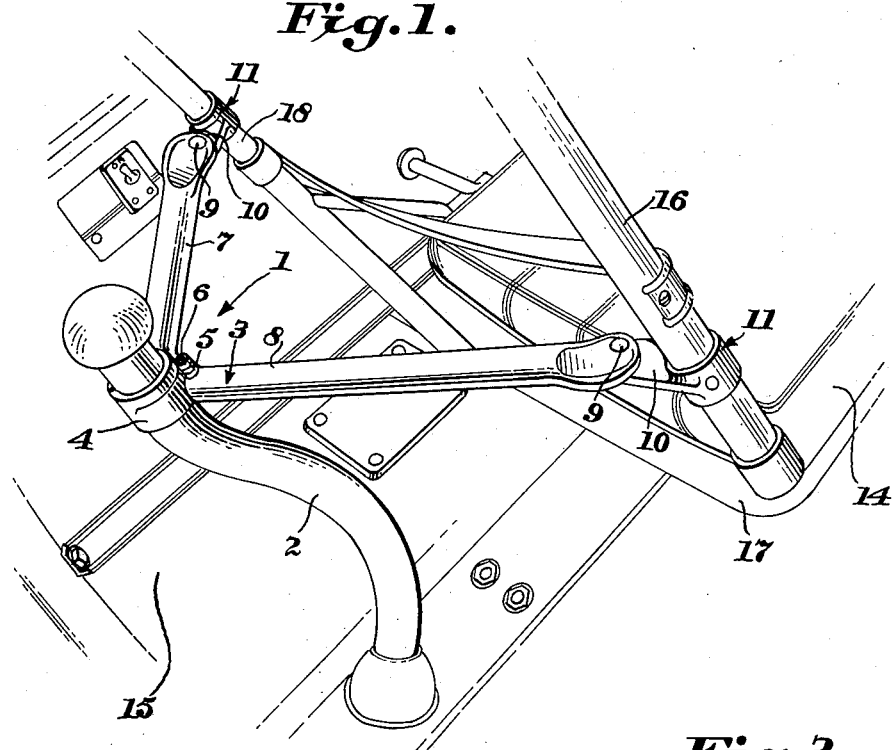
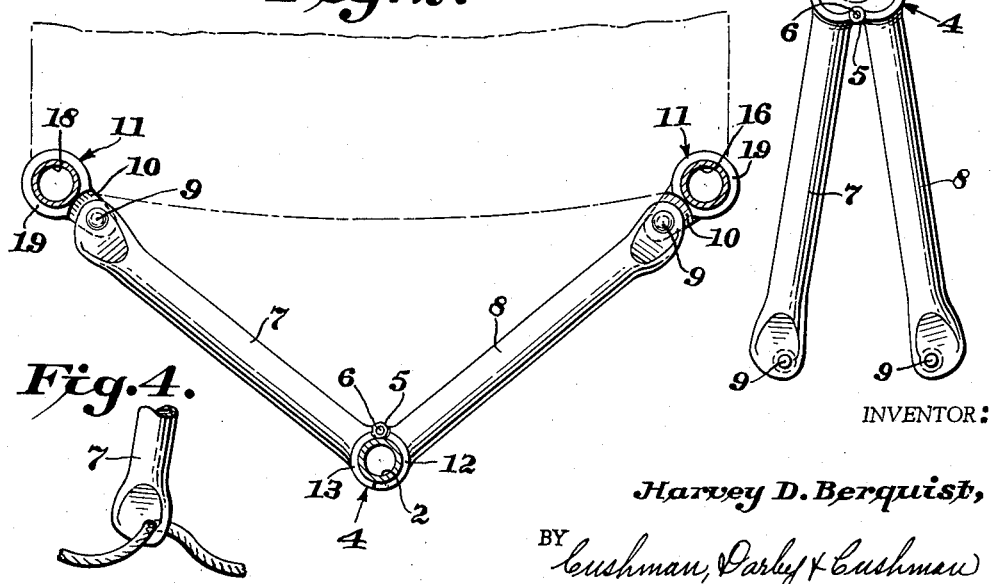
INVENTOR:
Harvey D. Berquist,
BY Cushman, Darby & Cushman
ATTORNEYS.

United States Patent Office 2,967,681
Patented Jan. 10, 1961

2,967,681

CONTROL STICK LOCK

Harvey D. Berquist, Frederic, Wis.

Filed Oct. 9, 1957, Ser. No. 689,241

1 Claim. (Cl. 244—83)

This invention relates to locking means for the control surfaces of aircraft and, more particularly, to apparatus for the purpose of maintaining the control surfaces in a stationary position when an airplane is on the ground.

When aircraft are left standing or parked with no one at the controls, the control surfaces of the craft are susceptible of damage by being flapped up and down or from side to side under the influence of windgusts. Even where the surfaces themselves are not directly injured, the control system is subjected to excessive wear and might be forced through limits of movement which the system could not safely undergo without serious strain.

Accordingly, it is an object of this invention to provide an apparatus for preventing the movement of control surfaces to their limiting positions which apparatus thereby prevents breakage of the system and parts associated therewith.

Many aircraft now being produced are equipped with a lever which controls movement of the various control surfaces and which is commonly referred to as a "control stick." An apparatus which would hold the control stick in an aircraft in a stationary position would also prevent movement of the control surfaces.

It is a particular object of this invention to provide an apparatus for maintaining a control stick operably disposed in an aircraft in a predetermined position. Such an apparatus will be hereinafter referred to as a "control stick lock apparatus," and the removable element of the apparatus which connects directly to the control stick will be referred to as the "control stick lock."

It is a further object of this invention to provide a control stick lock apparatus which is small, and easy to install.

It is a still further object of this invention to provide a control stick lock which may be readily removed from operative position and carried in the aircraft when not in use.

Other objects and advantages will be more particularly pointed out hereinafter or will become apparent after considering the following description in conjunction with the drawings in which:

Figure 1 is a side elevational view showing the elements of the control stick apparatus in their operative relationship;

Figure 2 is a top plan view of the control stick lock apparatus with the elements in operative relationship;

Figure 3 is a top p!an view of the control stick lock in one position to which it may be adjusted when not in use; and Figure 4 is a fragmental detail of a modification of this invention.

In Figure 1, is shown the cockpit of an aircraft having a frame 15 in which a control stick 2 is operably disposed. As shown, the control stick 2 projects from the floor of the cockpit; however, it should be understood that the apparatus of the invention may be used on a control stick which is disposed in another position. Encasing a portion of the control stick is a collar 4, which comprises two jaw members 12 and 13 as shown in Figure 3. The jaw members are joined at cooperating edges by a hinge 5 through which a rivet 6 extends. The hinge may comprise, as shown, meshing projections intergral with jaws 12 and 13, or it may be a separate hinge member attached thereto. The jaws 12 and 13 thus can be opened and closed. Any pivotal means may be used in place of hinge 5 and rivet 6 without transcending the scope of the invention.

Numerals 7 and 8 designate bar members, of tubular form as shown, which are connected at one end to collar 4 by any suitable means such as a weld. The opposite end of each bar carries attaching means as shown at 9. The attaching means comprises a suitably-formed aperture through which a rivet passes. Thus, a projection extends from the bar.

Referring to Figure 1, the numeral 17 designates a rigid support member which is attached to said frame 15 and which is adapted to support a seat 14. Two posts 16 and 18 are rigidly connected to member 14 and are thereby secured indirectly to frame 15. Clamped to posts 16 and 18 are clamp members 11 which carry horizontal extensions 10. At the end of the horizontal extensions are suitably-formed apertures (not shown) for receiving the projections carried by the bars. These projections may be carried by extensions 10 or by the bars 7 and 8; however, as shown, they are carried by the bars. In place of the rivets, bolts may be used for the projections. In fact, the attaching means may comprise suitable-formed apertures in the bars through which a cord projects as shown in Figure 4 and, in such case, the bars may be secured to rigid members by the cord, and the clamping members may be eliminated.

As shown, the clamping members 11 comprise a collar 19, preferably made from flat stock, which encases a rigid member 16 or 18. The collar is fixedly secured to the rigid member with which it is associated by any suitable means such as a weld.

In operation, when it is desired to lock the control stick in a given position, the control stick lock, generally designated by the numeral 1, is placed in operative position as shown in Figure 1. The collar 4 surrounds a portion of the control stick 2, and the bars 7 and 8 maintain the collar in position as they are rigid and are connected through attaching means 9 to the extensions 10 of clamp members 11.

When it is desired to remove the control stick lock, of the preferred embodiment shown in Figure 1, from operative position the pilot of the aircraft merely raises the control stick lock, thereby freeing the attaching means 9 from their connection with extensions 10 carried by clamp members 11. After such connection is severed, the pilot presses bar members 7 and 8 together, thereby opening jaws 12 and 13 and the control stick lock 1 is then disengaged from control stick 2. After the control stick lock is disengaged from the control stick, the lock is placed in any convenient position within the aircraft awaiting further use when the craft is grounded.

Although the precise construction shown has been described in detail, various modifications may be made. For example, the clamping members need not be formed as shown, but may comprise any clamping means known, for instance, pieces of metal wire may be twisted around the support members and have one end which extends upward and which is received by suitably-formed apertures in the bars 7 and 8. Or, the clamping members may be eliminated if a cord is used as suggested hereinabove.

The jaws 12 and 13 of collar 4 are shown to have an inner surface which is of a configuration corresponding to the outer surface of control stick 2, but, although such is preferable, the inner surfaces need not be so shaped. Also, the inner surfaces of jaw members 12 and 13 may be covered with a padding material such as felt or soft rubber in order to avoid scratching or damaging of the surface of control stick 2.

While the form of the apparatus described in detail herein presents a preferred embodiment of the invention, it is to be understood that the apparatus is not limited thereto, and changes may be made therein as suggested above without departing from the scope of the invention as defined in the claim.

I claim:

For use in an airplane having a control stick operably disposed therein and a frame to which is secured directly or indirectly rigid members, a control stick lock apparatus comprising a cylindrical collar having a pair of semicylindrical pivotally-connected jaw members adapted to encase a portion of said control stick, the configuration of the inside surface of each of said jaw members corresponding to the configuration of a portion of the outer surface of said control stick, a pair of rigid bars, each of said bars being attached at one end to a different one of said jaw members whereby when said jaw members engage said control stick said bars form a V-shape having an apex at said collar, each of said bars having at the end thereof opposite said one end a projection, and a pair of clamp members carried in spaced relation by the rigid members and having suitably-formed apertures for receiving said projections.

References Cited in the file of this patent

UNITED STATES PATENTS

| | | |
|---|---|---|
| 970,549 | Price | Sept. 20, 1910 |
| 2,035,231 | Haberstro | Mar. 24, 1936 |
| 2,705,121 | Kaminsky et al. | Mar. 29, 1955 |

FOREIGN PATENTS

| | | |
|---|---|---|
| 637,484 | Germany | July 6, 1935 |